(12) United States Patent
Yu et al.

(10) Patent No.: US 8,946,915 B2
(45) Date of Patent: Feb. 3, 2015

(54) ADAPTIVE VARIABLE SPEED GENSET CONTROL

(71) Applicant: Caterpillar Inc., Peoria, IL (US)

(72) Inventors: Dachuan Yu, Normal, IL (US); Gregory J. Speckhart, Peoria, IL (US); Eric Matthew Andris, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 136 days.

(21) Appl. No.: 13/798,751

(22) Filed: Mar. 13, 2013

(65) Prior Publication Data

US 2014/0265353 A1    Sep. 18, 2014

(51) Int. Cl.
*F02D 29/06*    (2006.01)
*H02P 9/04*    (2006.01)

(52) U.S. Cl.
CPC ........................................ *H02P 9/04* (2013.01)
USPC ...................................................... 290/40 B

(58) Field of Classification Search
CPC .......................................................... H02P 9/04
USPC ........................................................ 290/40 B
See application file for complete search history.

(56) References Cited

U.S. PATENT DOCUMENTS 6,879,053 B1    4/2005  Welches et al.
2009/0140576 A1*  6/2009  Yu et al. .......................... 307/66

* cited by examiner

*Primary Examiner* — Javaid Nasri
(74) *Attorney, Agent, or Firm* — Miller, Matthias & Hull

(57) ABSTRACT

A method of determining an optimal operating speed of a variable speed genset is provided. The method may include determining whether an actual operating speed of the genset approximates a desired operating speed, the desired operating speed being predetermined based on a measured load value associated with the genset, the desired operating speed being associated with an applied offset value that is adjustable between a minimum offset value and a maximum offset value; incrementing the applied offset value of the desired operating speed to decrease the actual operating speed if the actual operating speed approximates the desired operating speed, and the applied offset value is less than the maximum offset value; and determining the desired operating speed as the optimal operating speed if the actual operating speed approximates the desired operating speed, and the applied offset value is equal to the maximum offset value.

20 Claims, 3 Drawing Sheets

ADAPTIVE VARIABLE SPEED GENSET CONTROL

TECHNICAL FIELD

The present disclosure generally relates to variable speed gensets, and more particularly, to systems and methods for controlling a variable speed genset at optimal operating speeds.

BACKGROUND

Electric machines, such as induction machines, switched reluctance machines, and other comparable types of electric machines, are commonly used in the industry to convert electrical energy into rotational torque or rotational torque into electrical energy for any one of a variety of different applications including machine tools, traction motors, industrial work machines, stationary drive machines, mobile work vehicles, hybrid electric vehicles, and the like. Electric machines are commonly employed in association with a primary power source, such as an internal combustion engine or any other comparable prime mover, to provide a combined genset which serves to generate electrical and/or mechanical energy.

In a typical variable speed genset, a primary power source is mechanically and/or rotatably coupled to a rotor of the electric machine, while the stator of the electric machine is in turn electrically coupled to a common bus of the associated vehicle, machine and/or tool. The common bus generally communicates electrical power between the electric machine and one or more connected loads. In a generating mode of operation, the primary power source rotates the rotor of the electric machine to cause electromagnetic interactions which generate electrical energy to be stored and/or employed by one or more of the connected loads. Moreover, the operating speed of the primary power source may be correlated to the resulting electrical power that is communicated to connected loads.

Accordingly, the operating speed of the primary power source of a typical genset may be varied, for instance, according to predefined power-speed curves which suggest different nominal speeds for different anticipated loads, in an effort to conserve fuel and other system resources. In actual practice, however, such predefined relationships are not always fixed and can be adversely affected by any one or more of a variety of factors, such as fuel quality, fuel type, environmental temperature, altitude, system age, system wear, and the like. Moreover, because of such uncontrollable variants, gensets often exhibit inefficient characteristics despite strict adherence to predefined and suggested target speeds.

The present disclosure is directed at addressing one or more of the deficiencies set forth above.

SUMMARY OF THE DISCLOSURE

In one aspect of the present disclosure, a method of determining an optimal operating speed of a variable speed genset is provided. The method may include determining whether an actual operating speed of the genset approximates a desired operating speed, the desired operating speed being predetermined based on a measured load value associated with the genset, the desired operating speed being associated with an applied offset value that is adjustable between a minimum offset value and a maximum offset value; incrementing the applied offset value of the desired operating speed to decrease the actual operating speed if the actual operating speed approximates the desired operating speed, and the applied offset value is less than the maximum offset value; and determining the desired operating speed as the optimal operating speed if the actual operating speed approximates the desired operating speed, and the applied offset value is equal to the maximum offset value.

In another aspect of the disclosure, an adaptive control system for a variable speed genset having at least a primary power source, an electric machine, and a common bus, is provided. The adaptive control system may include at least one controller in electrical communication with each of the primary power source and the common bus. The controller may be configured to determine a desired operating speed of the primary power source based on a load value associated with the common bus, where the desired operating speed is associated with an applied offset value that is adjustable between a minimum offset value and a maximum offset value; increment the applied offset value of the desired operating speed to decrease the actual operating speed if an actual operating speed of the primary power source approximates the desired operating speed and the applied offset value is less than the maximum offset value; and determine the desired operating speed as the optimal operating speed if the actual operating speed approximates the desired operating speed, and the applied offset value is equal to the maximum offset value.

In yet another aspect of the disclosure, a variable speed genset is provided. The variable speed genset may include a primary power source, an electric machine mechanically coupled to the primary power source, an energy storage device in electrical communication with the common bus, and at least one controller in electrical communication with one or more of the primary power source, the energy storage device and the common bus. The electric machine may be electrically coupled to one or more loads through a common bus. The controller may be configured to track an agreement between an actual operating speed and a desired operating speed of the genset, incrementally increase an applied offset value to the desired operating speed to decrease the actual operating speed as long as the agreement substantially holds and the applied offset value is not maximized, and operate the primary power source at an optimal operating speed when the agreement substantially holds and the applied offset value is maximized.

DETAILED DESCRIPTION

Figure 1:
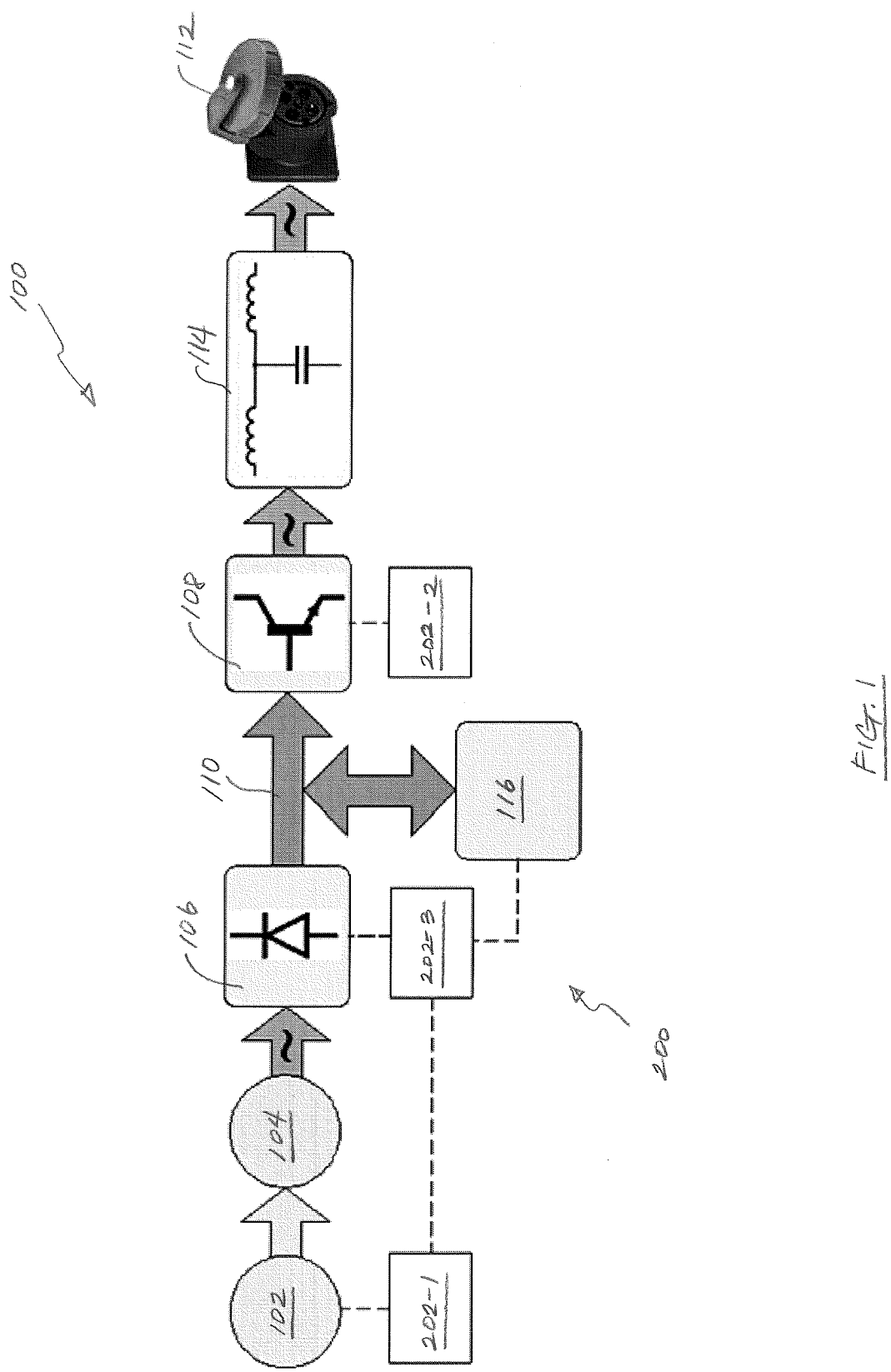
FIG. 1 is a diagrammatic view of a variable speed genset provided with an exemplary adaptive control system constructed in accordance with the teachings of the present disclosure.

Reference will now be made in detail to specific embodiments or features, examples of which are illustrated in the accompanying drawings. Generally, corresponding reference numerals will be used throughout the drawings to refer to the same or corresponding parts.

FIG. 1 diagrammatically illustrates one exemplary variable speed genset 100 that may be employed in conjunction with industrial work machines, stationary drive machines, mobile work vehicles, hybrid electric vehicles, machine tools, and the like. As shown, the variable speed genset 100 may generally include a primary power source 102, an electric machine 104, a rectifier circuit 106, an inverter circuit 108, a common bus 110 disposed between the rectifier circuit 106 and the inverter circuit 108, and one or more loads 112 associated with the variable speed genset 100. The genset 100 may additionally include a filter 114 for conditioning power sourced to one or more of the loads 112, as well as an energy storage device 116. The energy storage system 116 may comprise any one or more of a battery, ultracapacitor, or any other alternative source of energy capable of selectively supplying adequate electrical power, for example, a DC voltage approximating the bus voltage, to the common bus 110.

The primary power source 102 may include an internal combustion engine or any other comparable prime mover suitable for outputting mechanical energy, such as rotational torque at an output shaft thereof. The electric machine 104 may employ an induction machine, a switched reluctance machine, or any other suitable electric motor or generator commonly used in the art capable of generating electrical output in response to mechanical input, or mechanical output in response to electrical input thereto. For example, the electric machine 104 may include a rotor that electromagnetically interacts with and is rotatably disposed within a stator such that electrical input at the stator generates mechanical or rotational output at the rotor, as in a motoring mode of operation, or alternately, mechanical or rotational input at the rotor generates electrical energy at an output of the stator, as in a generating mode of operation. Moreover, the rotor of the electric machine 104 may be mechanically coupled to the output of the primary power source 102 and the stator may be electrically coupled to the common bus 110 through the rectifier circuit 106.

When operating in a generating mode of operation, as diagrammatically provided in the variable speed genset 100 of FIG. 1, the primary power source 102 may communicate a rotational torque at the input or rotor of the electric machine 104. As the rotor rotates within the stator of the electric machine 104, electrical power may be generated at the output of the stator and communicated to the rectifier circuit 106, which may further convert the AC voltage output by the electric machine 104 into DC voltage. The DC voltage may be communicated along the common bus 110 and to the inverter circuit 108 where the DC voltage may be converted into suitable AC voltage required by the connected loads 112. The AC voltage may further be at least partially conditioned by one or more appropriate filters 114 prior to sourcing the electrical power to the one or more loads 112.

Figure 2:
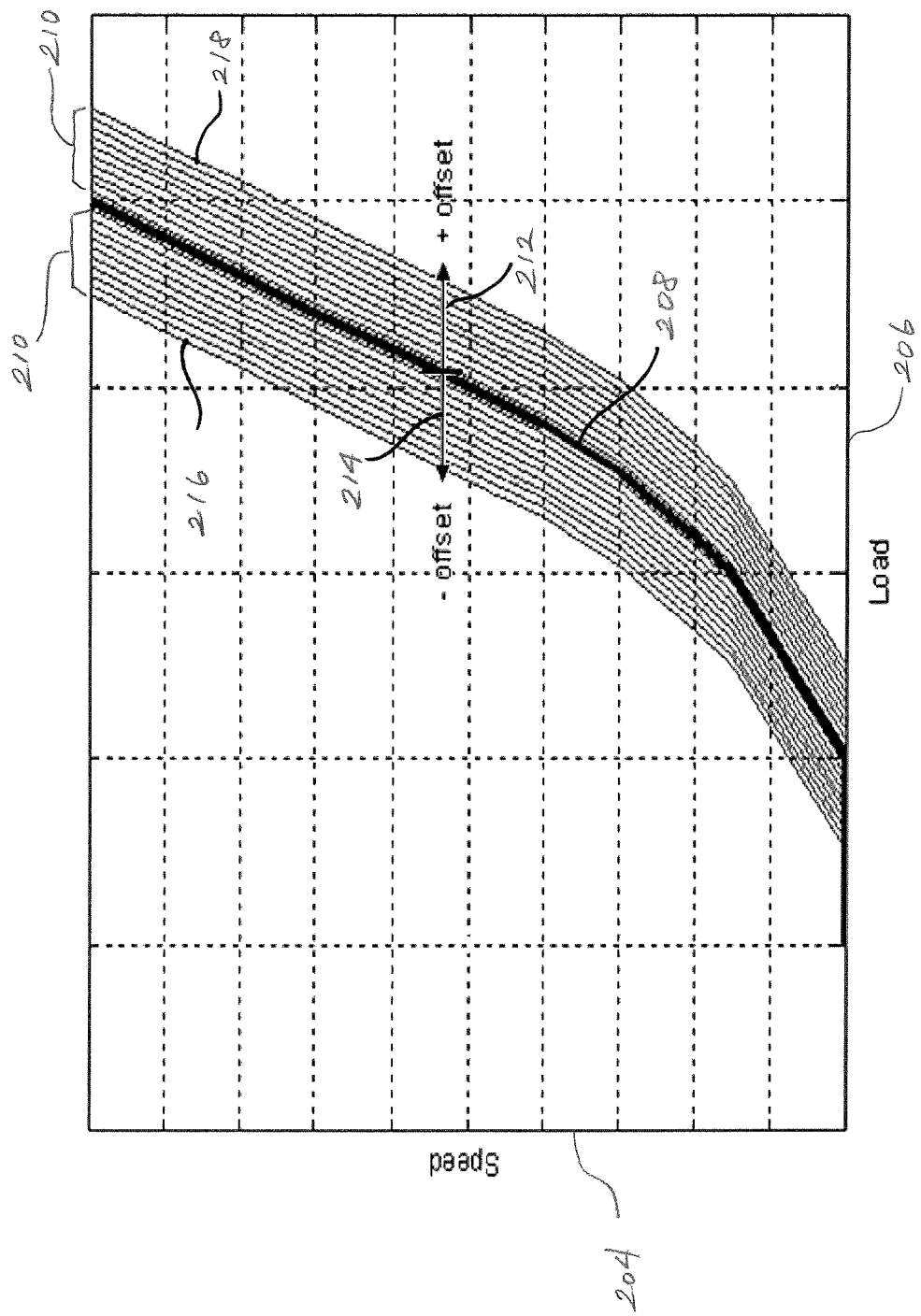
FIG. 2 is a graphical view of target operating speeds and applied offsets of a variable speed genset as a function of load demand.

The variable speed genset 100 of FIG. 1 may further be provided with an adaptive control system 200 having one or more controllers 202 configured to, among other things, adjust the operating speed of the genset 100, and thus, the power output thereof, according to changes in the load demand at any given instance. As shown in FIG. 2, different nominal operating speeds 204 for different anticipated load values 206 may be provided for reference in the form of one or more preprogrammed relationships 208, such as power-speed curves, or the like, retrievably stored in a memory accessible to the controller 202. Such predefined relationships 208 may preliminarily suggest ideal operating parameters by which the genset 100 is likely to perform with optimum performance and efficiency. For a given load value 206, for example, the controller 202 may reference the power-speed relationship 208 to determine the desired or target operating speed 204 that would generally be appropriate for the given load demand 206, and adjust the actual operating speed of the primary power source 102 in an effort to match or approximate that target operating speed 204.

Even with strict adherence to the target parameters suggested by such predefined relationships 208, the actual efficiency of the genset 100 may still deviate from the expected efficiency due to other dynamic factors such as fuel quality, fuel type, environmental temperature, altitude, system age, system wear, and the like. Accordingly, the adaptive control system 200 of FIG. 1 may further incorporate means for adapting the desired or target operating speed of the genset 100 for such factors, and adequately compensating for significant deviations in efficiency caused by such factors. This may be accomplished by incrementally adjusting an applied offset 210 to the power-speed curve 208 and determining an optimal operating speed, or the minimal operating speed at which the genset 100 is capable of supplying electrical power sufficient to match the load demand of the connected loads 112. At a given load value 206 in the relationship 208 provided in FIG. 2 for instance, incrementally increasing the applied offset 210 in the positive direction 212 may decrease the desired operating speed 204, and thus, urge the primary power source 102 to match the decreased desired operating speed 204, effectively decreasing the actual operating speed of the genset 100. Conversely, incrementally decreasing the applied offset 210 in the negative direction 214 may serve to increase the desired operating speed 204, and thus, urge the primary power source 102 to match the increased desired operating speed 204, effectively increasing the actual operating speed thereof. Furthermore, the applied offset 210 may be adjustable between a minimum offset value or limit 216, and a maximum offset value or limit 218.

Referring back to FIG. 1, the particular adaptive control system 200 provided may include a first controller 202-1 that is, at least in part, dedicated to monitoring operating conditions of the primary power source 102, such as the actual operating speed thereof. A second controller 202-2 may also be disposed in electrical communication with the inverter circuit 108 and configured to monitor for any changes in the load demand or value 206. Additionally, a third controller 202-3 may be electrically coupled to the rectifier circuit 106 and configured to monitor the bus voltage of the common bus 110. The third controller 202-3 may also be operatively coupled to the energy storage device 116 and adapted to selectively engage the energy storage device 116 to supplement the bus voltage with an adequate DC voltage as needed. Although shown with three controllers 202-1, 202-2 and 202-3, it will be understood that the adaptive control system 200 of FIG. 1 may similarly employ any plurality of controllers, as well as a single controller in electrical communication with each of at least the primary power source 102, the rectifier circuit 106, the energy storage device 116 and the inverter circuit 108.

Figure 3:
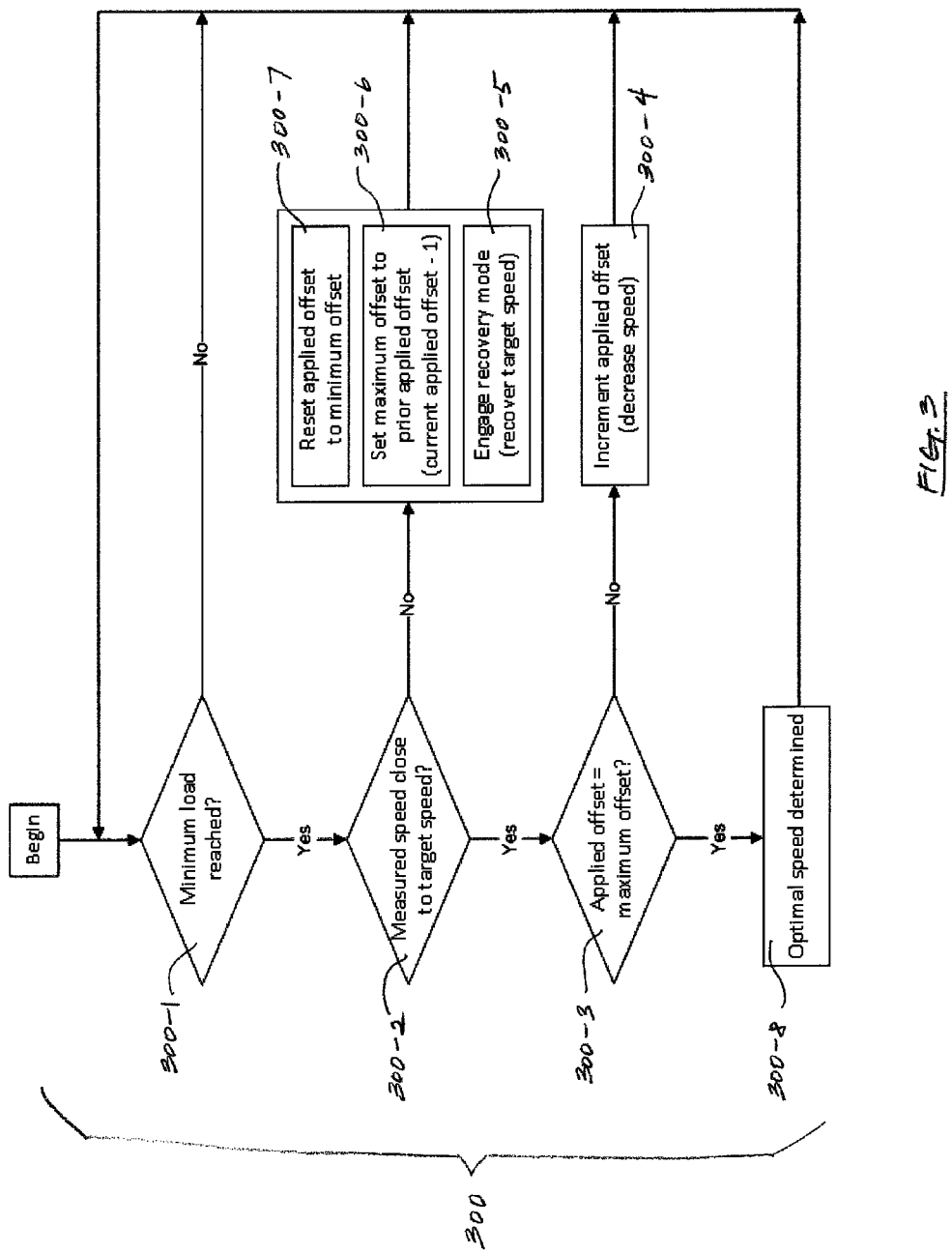
FIG. 3 is a flow diagram of one exemplary algorithm or method of determining an optimal operating speed of a variable speed genset.

The one or more controllers 202 of the adaptive control system 200 of FIG. 1 may be configured to operate according to a predetermined algorithm or method 300, as shown for example in FIG. 3. Such an algorithm or set of instructions may be preprogrammed or incorporated into a memory that is disposed within the controller 202 or is otherwise accessible by the controller 202. Furthermore, the controller 202 may be implemented using one or more of a processor, a microprocessor, a microcontroller, a digital signal processor (DSP), a field-programmable gate array (FPGA), an electronic control module (ECM), an electronic control unit (ECU), or any other suitable means for electrically engaging one or more tasks of the adaptive control system 200.

As shown in FIG. 3, the controller 202 in step 300-1 may be configured to monitor the load demand 206 as observed, for example, from the inverter circuit 108 to determine if a minimum load is reached or exceeded. The minimum load threshold may be predetermined based on any one of a variety of different characteristics, such as the type of primary power source 102 being used, the type of electric machine 104 being used, the architecture of the variable speed genset 100 being implemented, the types of loads 112 that are supported, and the like. For example, the controller 202 may be preprogrammed to fully engage the adaptive control system 200 only once the load demand 206 reaches a minimum threshold of approximately 15% of the total rated load of the genset 100, or any other minimum load under which the benefits of adjusting the operating speed of the genset 100 may be negligible. If the load demand 206 is determined to be less than the minimum threshold, the controller 202 may continue monitoring the load level 206 for satisfying conditions. If, however, the minimum load threshold is met or exceeded, the controller 202 may fully engage the adaptive control system 200 and proceed to optimize control of the genset 100 in step 300-2.

Once fully engaged, the controller 202 in step 300-2 may be configured to detect or measure the actual operating speed of the primary power source 102, and determine if the actual operating speed approximates the desired or target operating speed 208 as derived from one or more of the predefined relationships 208. If there is a substantial agreement between the actual operating speed and the target operating speed 208, the controller 202 may proceed to step 300-3 to determine whether the applied offset 210 can be further adjusted or if it is already at its maximum offset value or limit 218. If the applied offset 210 is not yet at its maximum limit 218, the controller 202 in step 300-4 may be configured to incrementally increase the currently applied offset 210 so as to decrease the target operating speed 208 by one increment, and thus, urge the actual operating speed of the primary power source 102 to similarly decrease by substantially one increment.

In a subsequent iteration, the controller 202 may return to step 300-1 to ensure that the minimum load demand 206 is still met, and to step 300-2 to determine whether there is still substantial agreement between the actual operating speed of the primary power source 102 and the adjusted desired or target operating speed 208. As long as both of the above conditions are satisfied, and as long as the currently applied offset 210 has not reached its maximum offset value 218, the controller 202 may again proceed to step 300-4 to increment the applied offset 210 in a manner that will again decrease the target operating speed 208 and effectively lower the actual operating speed of the primary power source 102. In this manner, the controller 202 may continue to repeat such iterations for a given load demand 206 until the actual operating speed is too low to maintain sufficient electrical power to the connected loads 112, or until the applied offset 210 has reached its maximum limit 218 and can no longer be incremented.

If the operating speed of the genset 100 has been lowered to a point where the electric machine 104 is no longer able to sufficiently support the given load demand 206, the controller 202 may, for example, observe a substantial disagreement between the actual operating speed and the target operating speed 208 during step 300-2. If such a disagreement is observed, the controller 202 may proceed to step 300-5 to engage a recovery mode of operation. Recovery modes may generally serve to temporarily supplement transient deficiencies in the power supplied by the electric machine 104 such that power to the connected loads 112 is substantially uninterrupted and maintained until the primary power source 102 recovers nominal operating speeds. For example, the controller 202 may engage secondary power sources, such as the energy storage device 116, to temporarily supply an adequate bus voltage to the common bus 110. Alternatively or additionally, the controller 202 may temporarily reallocate the distribution of the power supplied by the electric machine 104, for example, by disengaging less critical loads 112 and/or maintaining only more critical loads 112.

The controller 202 may simultaneously, or upon engaging the recovery mode, redefine or shift the bounds of the applied offset 210, the minimum and maximum offset values 216, 218, according to the newly discovered thresholds of the genset 100. Specifically, the controller 202 in step 300-6 may shift the maximum offset value 218 to the previously applied offset value, or the applied offset 210 that was applied during the prior iteration, and in step 300-7, reset the current offset value to the minimum offset value 216. By shifting back the desired operating speed 208 and the minimum and maximum limits 216, 218 of the applied offset 210, the controller 202 through steps 300-5, 300-6 and 300-7 may in effect urge the primary power source 102 to operate at higher operating speeds and restore an agreement between actual operating speed and the target operating speed 208. If, however, the agreement between the actual operating speed and the target operating speed 208 is maintained at step 300-2 such that a recovery mode need not be engaged, and if the applied offset 210 is found to be at its maximum limit 218 in step 300-3, the controller 202 may designate the instant desired or newly defined target operating speed 208 as the optimal operating speed of the genset 100 for the given load demand 206 in step 300-8. The controller 202 may be configured to continuously repeat such iterations of adjusting the applied offset 210 during operation of the genset 100 and for each significant change in load demand 206, as long as the load demand 206 exceeds the minimum load threshold defined in step 300-1. Moreover, in this manner, the adaptive control system 200 may be able to minimize the actual operating speed of the genset 100, conserving fuel and improving machine efficiency, without compromising the integrity of the power supplied to the connected loads 112.

INDUSTRIAL APPLICABILITY

In general, the foregoing disclosure finds utility in various applications relating to the control of vehicles, machines or tools employing variable speed gensets. More specifically, the disclosed systems and methods may be used to provide more efficient control of electric machines and related devices typically used in association with electric or hybrid drive systems including machine tools, traction motors, industrial work machines, stationary drive machines, mobile work vehicles, hybrid electric vehicles, and the like.

In particular, the disclosed adaptive control systems and methods enable a variable speed genset to adapt its control parameters to more efficient operating speeds, which take into consideration, not only the given load demand, but also other machine and environmental dynamics such as fuel quality, fuel type, ambient temperatures, altitude, system age, and the like. More particularly, for a given load, the present disclosure continuously assesses the minimum operating speed necessary to sufficiently supply power to the connected loads, and operates the genset at those minimum operating speeds in a manner which conserves fuel without compromising power supplied to the loads.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A method of determining an optimal operating speed of a variable speed genset, comprising the steps of:
    determining whether an actual operating speed of the genset approximates a desired operating speed, the desired operating speed being predetermined based on a measured load value associated with the genset, the desired operating speed being associated with an applied offset value that is adjustable between a minimum offset value and a maximum offset value;
    incrementing the applied offset value of the desired operating speed to decrease the actual operating speed if the actual operating speed approximates the desired operating speed, and the applied offset value is less than the maximum offset value; and
    determining the desired operating speed as the optimal operating speed if the actual operating speed approximates the desired operating speed, and the applied offset value is equal to the maximum offset value.

2. The method of claim 1, further comprising the step of engaging a recovery mode if the actual operating speed does not approximate the desired operating speed, the recovery mode enabling the genset to restore the actual operating speed to the desired operating speed.

3. The method of claim 2, further comprising the steps of:
    adjusting the maximum offset value to a previously applied offset value, the previously applied offset value corresponding to one increment less than the applied offset value; and
    resetting the applied offset value to the minimum offset value.

4. The method of claim 2, wherein the recovery mode restores the actual operating speed to the desired operating speed by at least partially unloading the genset and reducing the load value.

5. The method of claim 2, wherein the recovery mode restores the actual operating speed to the desired operating speed by at least temporarily engaging one or more energy storage devices to supplement a bus voltage of a common bus of the genset.

6. The method of claim 1, further comprising the steps of:
    monitoring the load value associated with the genset; and
    proceeding to determine the optimal operating speed only if the load value exceeds a predefined minimum load value.

7. The method of claim 6, wherein the predefined minimum load value is approximately 15% of the total rated load of genset.

8. An adaptive control system for a variable speed genset having at least a primary power source, an electric machine, and a common bus, the adaptive control system comprising:
    at least one controller in electrical communication with each of the primary power source and the common bus, the controller being configured to:
    determine a desired operating speed of the primary power source based on a load value associated with the common bus, the desired operating speed being associated with an applied offset value that is adjustable between a minimum offset value and a maximum offset value,
    increment the applied offset value of the desired operating speed to decrease the actual operating speed if an actual operating speed of the primary power source approximates the desired operating speed and the applied offset value is less than the maximum offset value, and
    determine the desired operating speed as the optimal operating speed if the actual operating speed approximates the desired operating speed, and the applied offset value is equal to the maximum offset value.

9. The system of claim 8, wherein the controller is further configured to:
    engage a recovery mode if the actual operating speed does not approximate the desired operating speed, the recovery mode enabling the genset to restore the actual operating speed to the desired operating speed,
    adjust the maximum offset value to a previously applied offset value, the previously applied offset value corresponding to one increment less than the applied offset value, and
    reset the applied offset value to the minimum offset value.

10. The system of claim 8, further comprising an energy storage device in electrical communication with the common bus, the controller being configured to restore the actual operating speed to the desired operating speed by at least temporarily engaging the energy storage device to supplement a bus voltage of the common bus if the actual operating speed does not approximate the desired operating speed.

11. The system of claim 8, wherein the controller is configured to restore the actual operating speed to the desired operating speed by at least partially unloading the genset and reducing the load value if the actual operating speed does not approximate the desired operating speed.

12. The system of claim 8, wherein the controller is configured to determine the optimal operating speed only if the load value exceeds a predefined minimum load value.

13. The system of claim 12, wherein the predefined minimum load value is approximately 15% of the total rated load of genset.

14. The system of claim 8, wherein the at least one controller receives information pertaining to the actual operating speed from the primary power source, receives information pertaining to the load value from an inverter associated with the common bus, and receives information pertaining to a bus voltage from a rectifier circuit associated with the common bus.

15. The system of claim 8, wherein the desired operating speed is determined based on one or more preprogrammed relationships defined between different load values and corresponding nominal operating speeds.

16. A variable speed genset, comprising:
    a primary power source;
    an electric machine mechanically coupled to the primary power source, the electric machine being electrically coupled to one or more loads through a common bus;
    an energy storage device in electrical communication with the common bus; and
    at least one controller in electrical communication with one or more of the primary power source, the energy storage device and the common bus, the controller being configured to:
    track an agreement between an actual operating speed and a desired operating speed of the genset,
    incrementally increase an applied offset value to the desired operating speed to decrease the actual operating speed as long as the agreement substantially holds and the applied offset value is not maximized, and operate the primary power source at an optimal operating speed when the agreement substantially holds and the applied offset value is maximized.

17. The variable speed genset of claim 16, wherein the controller is configured to restore the actual operating speed to the desired operating speed by at least temporarily engaging the energy storage device to supplement a bus voltage of the common bus if the agreement between the actual operating speed and the desired operating speed does not hold.

18. The variable speed genset of claim 16, wherein the controller is configured to restore the actual operating speed to the desired operating speed by at least partially unloading the genset and reducing the load value if the agreement between the actual operating speed and the desired operating speed does not hold.

19. The variable speed genset of claim 16, wherein the at least one controller receives information pertaining to the actual operating speed from the primary power source, receives information pertaining to the load value from an inverter associated with the common bus, and receives information pertaining to a bus voltage from a rectifier circuit associated with the common bus.

20. The variable speed genset of claim 16, wherein the desired operating speed is determined based on one or more preprogrammed relationships defined between different load values and corresponding nominal operating speeds.

* * * * *